United States Patent
Herloski

(10) Patent No.: US 9,470,831 B2
(45) Date of Patent: Oct. 18, 2016

(54) LIGHT PIPE LED ILLUMINATOR FOR ILLUMINATING AN IMAGE BEARING SURFACE

(71) Applicant: Xerox Corporation, Norwalk, CT (US)

(72) Inventor: Robert Paul Herloski, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/548,781

(22) Filed: Nov. 20, 2014

(65) Prior Publication Data

US 2016/0147001 A1    May 26, 2016

(51) Int. Cl.
*F21V 8/00* (2006.01)
*B41J 2/45* (2006.01)

(52) U.S. Cl.
CPC ............... *G02B 6/0008* (2013.01); *B41J 2/45* (2013.01)

(58) Field of Classification Search
CPC .............. B41J 2/473; B41J 2/451; B41J 2/47
USPC ........ 347/230, 238, 239, 255, 256; 356/445, 356/446; 362/296.09, 297, 301, 308, 309, 362/327, 330, 339
See application file for complete search history.

(56) References Cited

U.S. PATENT DOCUMENTS

| | | | |
|---|---|---|---|
| 4,967,238 A | 10/1990 | Bares et al. | |
| 6,347,873 B1 * | 2/2002 | Hosseini | G01D 11/28 362/558 |
| 6,975,949 B2 | 12/2005 | Mestha et al. | |
| 7,178,923 B2 * | 2/2007 | Imade | G03B 21/208 348/801 |
| 7,544,923 B1 | 6/2009 | Herloski et al. | |
| 7,549,783 B2 | 6/2009 | Cassarly et al. | |
| 7,763,876 B2 | 7/2010 | Banton et al. | |
| 7,764,382 B2 | 7/2010 | Tandon et al. | |
| 8,010,001 B2 | 8/2011 | Donaldson | |

FOREIGN PATENT DOCUMENTS

| | | |
|---|---|---|
| JP | 2014007033 A | 1/2014 |
| JP | 2014064071 A | 4/2014 |
| JP | 2014090403 A | 5/2014 |

OTHER PUBLICATIONS http://www.luminitco.com/products/light-shaping-diffusers, first accessed Oct. 8, 2014.

* cited by examiner

*Primary Examiner* — Lamson Nguyen
(74) *Attorney, Agent, or Firm* — Simpson & Simpson, PLLC

(57) ABSTRACT

An illumination apparatus for illuminating an image bearing surface, comprising including an end-coupled illuminator comprising a light pipe having a first end face, a lateral surface and an illuminator longitudinal axis, a first light source (e.g., an LED) arranged to emit first light into the light pipe through the first end face, and a plurality of extractors disposed at selected locations along the illuminator longitudinal axis each adapted to deflect a corresponding portion of the first light from the light pipe though the lateral surface. The apparatus also includes a diffuser positioned to receive the portions of the first light and diffuse the portions of the first light in the direction of the illuminator longitudinal axis. The illumination apparatus may be included in a copier or a printer.

22 Claims, 6 Drawing Sheets

LIGHT PIPE LED ILLUMINATOR FOR ILLUMINATING AN IMAGE BEARING SURFACE

TECHNICAL FIELD

The present disclosure relates to a system for providing specular reflectance of an image bearing surface in a printer or a copier.

BACKGROUND

In a printing system (also referred to herein as a "printer") or a copier system (also referred to herein as a "copier"), an image input module is used to measure reflection from an image bearing surface and from test patches on the image bearing surface. Often, these image input modules are referred to as densitometers, as they are imaging the image bearing surface to detect the toner deposition or lack thereof on the image bearing surface. These measured reflections are used for calibration of the printer or copier.

In prior systems, the image input module used illumination apparatus comprising a fluorescent lamp or a rare gas lamp for illuminating substantially linear portions of the image bearing surface and the test patches. However, fluorescent lamps and rare gas lamps are relatively expensive. More recently, systems have employed illumination apparatus comprising discrete, light emitting diodes (LEDs) which are located on a conventional printed circuit board. In such illumination systems, the LEDs perform nearly as point sources which together operate to provide illumination along substantially linear portions of the image bearing surfaces.

SUMMARY

The uniformity of the light output (i.e., radiance) from illumination apparatus of conventional LED illumination systems is controlled in-part by reducing the spacing between adjacent LEDs. In a further effort to reduce expense and spacing between point sources of light in an LED illumination system, a new class of illuminator (referred to herein as an end-coupled illuminator) has been produced using a light pipe having two opposing end faces and a lateral surface. Two LEDs (or in some instances only one LED) each end-coupled to shine LED light into a corresponding one of the end faces and through the light pipe. The light pipe includes a plurality of light extractors (also referred to herein as extractors) which cause portions of the LED light projected through the light pipe to exit the light pipe through a lateral surface of the light pipe at selected locations along light pipe. However, a disadvantage of such systems is that they continue to provide insufficiently uniform radiance. As set forth below, aspects of the present disclosure are directed to improving the uniformity of radiance for systems using an end-coupled LED illuminator.

Aspects of the present disclosure are directed to an illumination apparatus for illuminating an image bearing surface, comprising an end-coupled illuminator comprising a light pipe having a first end face, a lateral surface and an illuminator longitudinal axis, a first light source arranged to emit first light into the light pipe through the first end face, and a plurality of extractors disposed at selected locations along the illuminator longitudinal axis each adapted to deflect a corresponding portion of the first light from the light pipe though the lateral surface, and a diffuser positioned to receive the portions of the first light and diffuse the portions of the first light in the direction of the illuminator longitudinal axis.

In some embodiments, the diffuser is an elliptical diffuser.

In some embodiments, the diffuser has a diffuser longitudinal axis that is substantially parallel to the illuminator longitudinal axis, the diffuser having a greater diffusion along the diffuser longitudinal axis than along a second axis that is perpendicular to the illuminator longitudinal axis and perpendicular to a plane including the illuminator longitudinal axis and the diffuser longitudinal axis.

In some embodiments, the first light source comprises a first LED. The first light source may comprise a first plurality of sources of light. In some embodiments, sources of light constituting the first plurality of sources of light are all adapted to emit light of a same color. The first plurality of sources of light may comprise a first source of light emitting light of a first color and a second source of light emitting light of a second color.

In some embodiments, the light pipe has a second end face, the illuminator further comprising a second light source arranged to emit a second light into the light pipe through the second end face, at least some of the plurality of extractors each adapted to deflect a corresponding portion of the second light from the light pipe though the lateral surface toward the diffuser.

In some embodiments, the second light source comprises a second LED.

In some embodiments, the extractors comprise at least one of a diffractive element, a refractive element and a reflective element.

Another aspect of the present disclosure is directed to a printer or copier, comprising a print engine configured to apply a marking medium to an image bearing surface, and a system for illuminating the image bearing surface in the printer or copier. The system comprises A) an illumination apparatus comprising (i.) an end-coupled illuminator comprising a light pipe having a first end face, a lateral surface, an illuminator longitudinal axis, a first light source arranged to emit first light into the light pipe through the first end face, and a plurality of extractors disposed at selected locations along the illuminator longitudinal axis each adapted to deflect a corresponding portion of the first light from the light pipe though the lateral surface; and (ii.) a diffuser positioned to receive the portions of the first light and diffuse the portions of the first light in the direction of the illuminator longitudinal axis and thereby provide a light output, the illumination apparatus positioned to direct the light output onto the image bearing surface, and the system further comprises B.) a light sensor positioned relative to the image bearing surface such that at least one of a specular portion and a diffuse portion of the light output reflected from the image bearing surface is received by the light sensor.

The diffuser may be an elliptical diffuser. In some embodiments, the diffuser has a diffuser longitudinal axis that is substantially parallel to the illuminator longitudinal axis, the diffuser having a greater diffusion along the diffuser longitudinal axis than along a second axis that is perpendicular to the illuminator longitudinal axis and perpendicular to a plane including the illuminator longitudinal axis and the diffuser longitudinal axis.

The first light source may comprise a first LED. The first light source may comprise a first plurality of sources of light. In some embodiments, the sources of light constituting the first plurality of sources of light are all adapted to emit light of a same color.

The first plurality of sources of light may comprise a first source of light adapted to emit light of a first color and a second source of light adapted to emit light of a second color.

In some embodiments, the light pipe has a second end face, the illuminator further comprising a second light source arranged to emit a second light into the light pipe through the second end face, at least some of the plurality of extractors each adapted to deflect a corresponding portion of the second light from the light pipe though the lateral surface toward the diffuser.

The second light source may comprise a second LED.

In some embodiments, the extractors comprise at least one of a diffractive element, a refractive element and a reflective element.

As defined herein, the term "radiance" is a measurement of light from a illuminator measured at an output surface of the illuminator.

As defined herein, the term "irradiance" is a measurement of a light incident on a surface at a particular distance from an illuminator.

Other objects, features and advantages of one or more embodiments will be readily appreciable from the following detailed description and from the accompanying drawings and claims

BRIEF DESCRIPTION OF THE SEVERAL VIEWS OF THE DRAWING

The nature and mode of operation of aspects of the present disclosure will now be more fully described in the following detailed description of the disclosure taken with the accompanying drawing figures, in which.

DETAILED DESCRIPTION

Figure 1A:
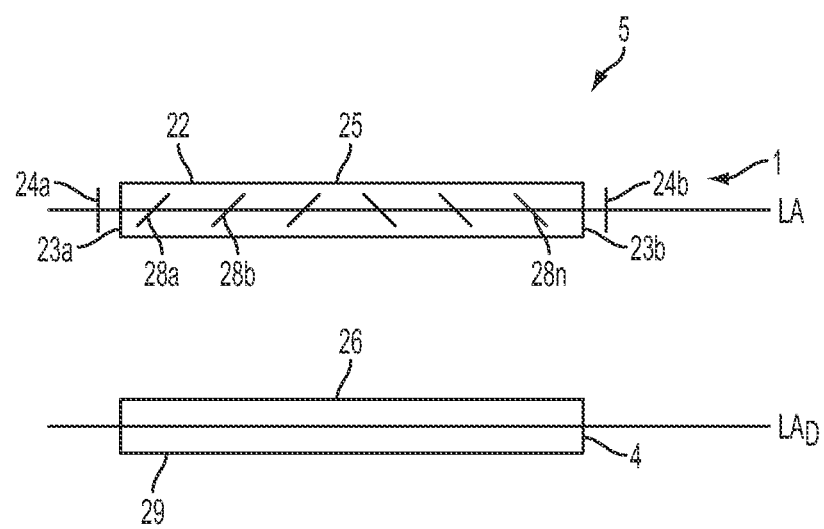
FIG. 1A is a top view, schematic illustration of an example of an end-coupled LED illuminator according to aspects of the present disclosure.

At the outset, it should be appreciated that like drawing numbers on different drawing views identify identical, or functionally similar, structural elements of the embodiments set forth herein. Furthermore, it is understood that these embodiments are not limited to the particular methodology, materials and modifications described and as such may, of course, vary. It is also understood that the terminology used herein is for the purpose of describing particular aspects only, and is not intended to limit the scope of the disclosed embodiments, which are limited only by the appended claims.

The law of reflection states that the direction of a specular component of outgoing reflected light from a surface and the direction of incoming light to the surface make the same angle with respect to the surface normal. That is, the angle of incidence is equal to the angle of reflectance.

Specular reflection refers to the mirror-like reflection of light from a surface, in which light from a single incoming direction is reflected in a single outgoing direction. In contrast, diffuse reflection is reflection of light from a surface, in which light from a single incoming direction is reflected in many directions, due to material irregularities and/or surface irregularities that cause the rays of light to reflect in many different outgoing directions. The type of reflection that occurs in a particular situation depends on the structure of the material and surface. For example, in a printer, an area on an image bearing surface that is covered by toner exhibits a higher proportion of diffuse reflection, while an area on an image bearing surface that is not covered by the toner exhibits a higher proportion of specular reflection.

An image input module in a printer measures reflections from an image bearing surface and from the test patches on the image bearing surface. Test patches are predetermined patches of toner periodically transferred to the image bearing surface for calibration purposes. By imaging the test patches, the printer can evaluate each printed test patch against its optimal characteristics, and make adjustments to the toner deposition functionality of its print engine accordingly. For example, the image input module may use these reflections in a streak correction methodology of the printer.

Specular reflectance is particularly useful for halftone masking of an image bearing surface. Halftone techniques simulate continuous tone imagery through the use of equally spaced dots of varying size. In halftone techniques, the density of colored dots (typically the four colors, cyan, magenta, yellow and black), within an area is varied to reproduce any particular shade. Therefore with halftone, the patches have dots with toner and blank areas between these dots. If the patches are more dense, i.e., more dots per area coverage, then the specular signal received from the image bearing surface, which is an indication of the blank areas that are not covered by the toner, is weaker. On the other hand, if the patches are less dense, i.e., less dots per area coverage, then the specular signal received from the image bearing surface, which is an indication of the blank areas that are not covered by the toner, is stronger.

Printers and copiers generally have two important dimensions: the process (or slow scan) direction and the cross-process (or fast scan) direction. The direction in which an image bearing surface moves is referred to as the process (or slow scan) direction, and the direction in which the plurality of sensors are oriented is referred to as the cross-process (or fast scan) direction. The cross-process (or fast scan) direction is generally perpendicular to the process (or slow scan) direction.

An image input module typically comprises an illumination apparatus, a lens (such as a self-focusing gradient index lens, e.g., a Selfoc® lens) and an image sensor. The angular distribution of light projected by the illumination apparatus onto the image bearing surface can vary in the fast scan direction, depending upon the illumination apparatus architecture, particularly in the case of apparatus comprising discrete light sources such as LEDs or extractors of an end-coupled illuminator. Under specular conditions, the light received by the image sensor depends upon the angular acceptance angle of the imaging lens. The angular acceptance angle of the imaging lens can be expressed as $\pm\alpha$, where $\alpha$ may be 5°, 10°, or another predefined angle which is a fixed property of the lens. In general, light that is incident at an angle of $\leq\pm\alpha$ relative to the normal to the image bearing surface (in the fast scan direction) will, under specular reflection conditions, be reflected at an angle of $\leq\pm\alpha$ relative to the optical axis of the imaging lens and will be captured by the imaging lens and transmitted to the image sensor. Light outside that range of angles will not be transmitted by the lens. At locations along the fast scan direction that are above, or nearly above, an extractor, there is a significant portion of light with an angular distribution within the acceptance angle of the lens, and the specularly reflected light is transmitted to the image sensor. However, between extractors, if the gap is large enough, the only light incident on the image bearing surface has an angular distribution greater than the acceptance angle of the lens, and hence is not transmitted to the image sensor. Thus, for specularly reflected light, the uniformity of light detected by the image sensor is directly related to the uniformity of the light emitted (i.e., emitter radiance) by the illuminator, and for diffusely reflected light, the uniformity of light detected by the image sensor is directly related to the to uniformity of light at the image bearing surface.

By modifying the angular distribution of light from the light source(s), the quantity of light collected by the imaging lens in specular conditions can be made substantially the same at every location in the cross-process (fast scan) direction, independent of whether one is over an LED or extractor, or in between extractors.

The image input module is sensitive to the uniformity of the illumination received by the image sensors. Since the image input module measures both the specular reflection from the image bearing surface, which is an indication of the area that is not covered by the toner, and the diffuse reflection from the toner on the image bearing surface, which is an indication of the area that is covered by the toner, an important parameter to detect is the non-uniformity of the diffuse-to-specular ratio (on a pixel-by-pixel basis). As indicated above, the uniformity of the specular signal is related to the uniformity of the emitter radiance, and the uniformity of the diffuse signal is related to the uniformity of the irradiance at the image bearing surface. The specular reflectance from the image bearing surface is the desired signal in these measurements while the diffuse reflectance from the toner on the image bearing surface is an unwanted signal. Therefore, to maximize the specular component in relation to the diffuse component received by the image sensor of the image input module, it is desirable to improve the uniformity of the radiance at the output of the illuminator.

According to aspects of the present disclosure, a diffuser is introduced in an illuminator apparatus between an end-coupled illuminator of the illumination apparatus and an image bearing surface to generate a more uniform distribution of light output from the illuminator (i.e., the radiance of the light output, as measured at the exit surface of the diffuser, is more uniform than the light output, measured at the output surface of the end-coupled illuminator). Accordingly, the uniformity of the illumination projected from the illuminator is improved by using a light diffuser.

Figure 1B:
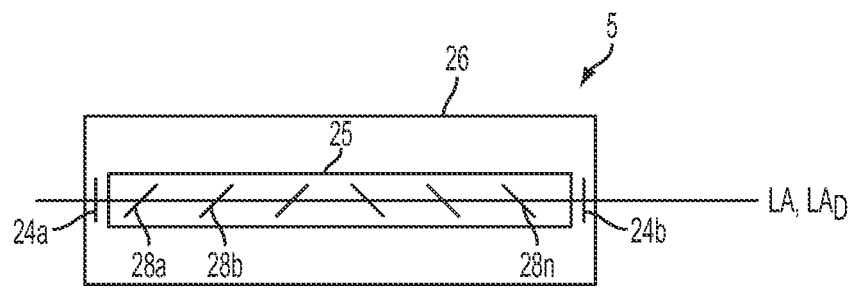
FIG. 1B is a plan view, schematic illustration of an the end-coupled LED illuminator of FIG. 1A.

FIGS. 1A and 1B are a top view and a plan view, respectively, of a schematic illustration of an example of an end-coupled LED illumination apparatus 5 according to aspects of the present disclosure. Illumination apparatus 5 comprises an end-coupled illuminator 1 comprising a light pipe 22 and LEDs 24a and 24b, and a diffuser 26.

As discussed in greater detail below, illumination apparatus 5 is used for illuminating an image bearing surface (shown in FIG. 2). Referring again to FIGS. 1A and 1B, light pipe 22 has a first end face 23a, a lateral surface 25 and an illuminator longitudinal axis LA.

A first LED 24a (or other light source) is arranged to emit first light into light pipe 22 through first end face 23a (i.e., the light source is optically coupled to the light pipe), and a plurality of extractors 28a-28n disposed at selected locations along the illuminator longitudinal axis LA are each adapted to deflect a corresponding portion of the first light from the light pipe though lateral surface 25 of the light pipe. In some embodiments, the light pipe includes a second end face 23b, and illuminator 1 further comprises a second LED 24b (or other light source) arranged to emit a second light into light pipe 22 through second end face 23b. At least some of the plurality of extractors are adapted to deflect a corresponding portion of the second light from the light pipe though lateral surface 25 toward diffuser 26.

In some embodiments, the extractors form a one-dimensional array and are equally spaced at regular intervals along longitudinal axis LA. In some embodiments, the extractors are spaced ≤about 4 mm apart along the longitudinal axis; however, it is to be appreciated that extractors may be disposed in any suitable arrangement along the light pipe. The combination of a linear array sensor and linear extractor array allows for high spatial resolution (e.g., 600 spots per inch) in both the slow scan and fast scan directions.

In some embodiments, multiple LEDs can project light into a given end of the light pipe. The LEDs may all be a same color (e.g., white) or of multiple colors, as described in U.S. Pat. No. 6,975,949, which is hereby incorporated herein by reference. Although embodiments described herein include LED light sources, other discrete sources of light are also contemplated, such as fiber optic light guide tubes. Further details of end-coupled illuminators suitable for use with embodiments described herein are given in U.S. Pat. No. 7,549,783 to Cassarly, the substance of which is hereby incorporated by reference herein.

Diffuser 26 is positioned to receive the portions of light that exit lateral surface 25 and diffuse the portions of light in the direction of the illuminator longitudinal axis LA. Diffuser 26 is adapted to provide a light output at a diffuser output surface 29 having a more uniform illumination profile in the direction of longitudinal axis LA than the light departing the end-coupled illuminator 1 at the lateral surface 25.

Light diffuser 26 is positioned between illuminator array 1 and image bearing surface 10. In some embodiments, is desirable that diffuser 26 have a diffuser longitudinal axis $LA_D$ having a greater diffusion along diffuser longitudinal axis $LA_D$ than along an axis that is perpendicular to the diffuser longitudinal axis $LA_D$ perpendicular to a plane including the illuminator longitudinal axis and the diffuser longitudinal axis. In such embodiments, it is typically desirable that diffuser longitudinal axis $LA_D$ is substantially parallel with the illuminator longitudinal axis to receive the portions of the light projected form the light pipe by the extractor.

Light diffuser 26 is positioned with respect to illuminator 1 to receive light beams projected from lateral surface 25 by extractors 28a-28n of illuminator 1. Light diffuser 26 homogenizes and directionally shapes the light beams coming from the light pipe. It is typically desirable that the diffuser transmit light with a high-transmission efficiency.

The light diffuser can be made of any light-diffusive material, such as polycarbonate or other plastic material. In one embodiment, the light diffuser, for e.g., 60°×1°, is used. The 60°×1° nomenclature specifies the angles of diffusion in two perpendicular directions. Suitable diffusers may have a variety of angles of diffusion. When in a copier or printer system, the "60" degree diffusion is oriented in the fast scan direction (which is also in the direction of longitudinal axis LA), and the "1" degree diffusion is oriented in the slow scan direction. Any high ratio of diffusion in the fast scan direction to diffusion in the low scan direction may be used. For example, ratios of 10°:1°, 20°:1°, 30°:1° or higher, including the 60°:1° may be used. Suitable diffusers of this type which are used in the current system are available as LSD® Light Shaping Diffusers from Luminit, LLC. Extractors $28_a$-$28_n$ comprise at least one of a diffractive element, a refractive element and a reflective element to redirect LED light toward lateral surface 25 and out of the light pipe.

Figure 2:
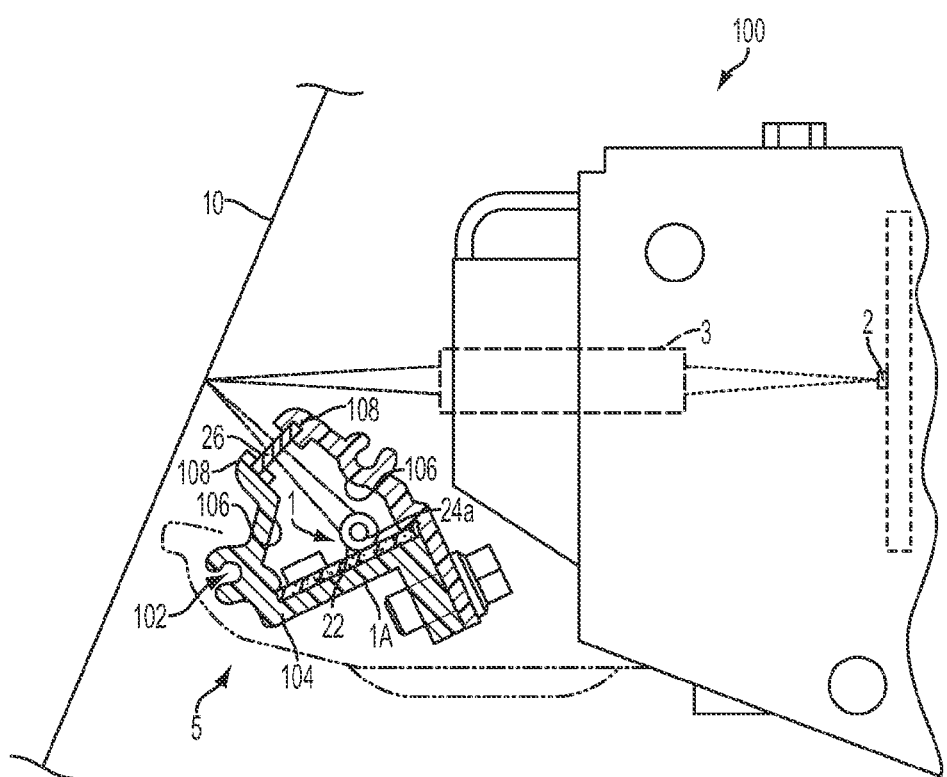
FIG. 2 is a schematic illustration of the end-coupled LED illuminator of FIG. 1A in an example embodiment of an image input module of a printer or copier according to aspects of the present disclosure.
Figure 3:
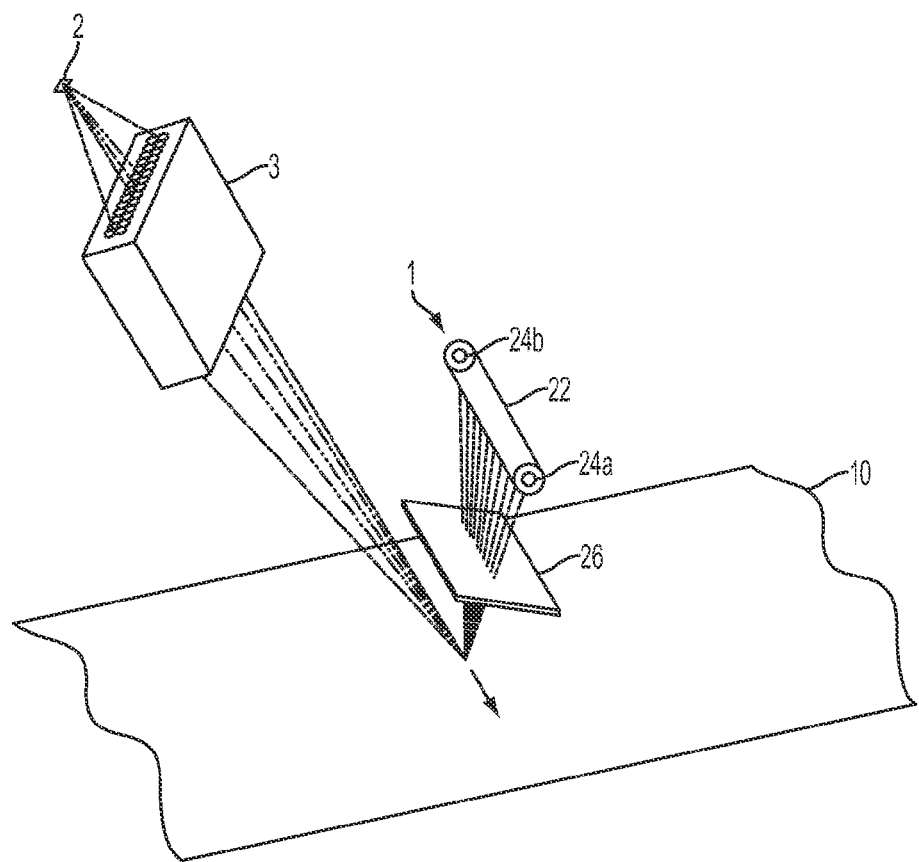
FIG. 3 is a perspective view of the end-coupled LED illuminator of FIG. 1A in an example embodiment of an image input module of a printer or copier according to aspects of the present disclosure.

FIGS. 2 and 3 show a printer or a copier system image input module comprising an illumination apparatus comprising an end-coupled illuminator 1 and a light diffuser 26 according to aspects of the disclosure. Image input module 100 includes a lens array 3, and a sensor array 2. It will be appreciated that the extractors may be of any suitable construction to partially deflect light projected through the light pipe toward a lateral surface of the light pipe. The extractors may diffract, reflect, and/or refract light to achieve the deflection. Illumination apparatus 5 may be configured in any manner as described herein. In the illustrated embodiment, a housing 102 of illumination apparatus 5 accommodates illuminator 1 and surrounds it. A printed circuit board 1A to which LEDs 24a and 24b (shown in FIG. 1A) are electronically and mechanically coupled is disposed on a base 104 of the housing 102. A pair of arms 106 extends from base 104 of the housing 102 encapsulating the LEDs therein. Light diffuser 26 is disposed in a recess 108 located on each of pair of arms 106. The illumination apparatus 5 thus allows light from the LEDs to exit through housing 102 containing diffuser 4, achieving highly uniform diffusion and light emission. As such, the radiance of the light beam exiting the diffuser can be highly uniform along the length of the illumination apparatus 5, despite the presence of the gaps between extractors $28_a$-$28_n$ of illuminator 1, and hence the specular signal at the image sensor can be highly uniform.

In an embodiment, an image bearing surface 10 used in the system is on a photoreceptor comprising a belt or a drum configuration. However, it may also be the printed document, or any other surface bearing an image.

Other factors, such as the distance of light diffuser 26 from illuminator 1, and/or the orientation of diffuser 26 relative to illuminator 1 are taken into account to reduce the diffuse-to-specular non-uniformity. For example, in one embodiment, a distance of about 5 mm (for the 60°×1° diffuser) was maintained between lateral surface 25 of light pipe 22 and diffuser 26. For example, in some embodiments, the diffuser comprises a diffusing surface that faces the illuminator array.

Lens array 3 is interposed between the image bearing surface 10 and the sensor array 2. The lens array may comprise, for example, a Selfoc® lens or other micro lens arrangement with a predetermined acceptance angle α. A Selfoc® lens is a gradient index lens which consists of fiber rods with parabolic index profile. In one embodiment, the Selfoc® lens has an acceptance angle α of about ±9 degrees.

In some embodiments, the linear array sensor is, for example, a full width array (FWA) sensor. A full width array sensor is defined as a sensor that extends substantially an entire width (perpendicular to a direction of motion) of the moving image bearing surface. The full width array sensor is configured to detect any desired part of the printed image, while printing real images. The full width array sensor may include a plurality of sensors equally spaced at intervals (e.g., every 1/600th inch (600 spots per inch)) in the cross-process (or fast scan) direction (see for example, U.S. Pat. No. 6,975,949, which is hereby incorporated by reference herein). It is understood that other linear array sensors may also be used, such as contact image sensors, CMOS array sensors or CCD array sensors.

In some embodiments, sensor array 2 includes a specular reflectance sensor array and a diffuse reflectance sensor array as discussed in detail in U.S. Pat. No. 7,763,876 to Banton, et al. which is hereby incorporated by reference herein.

Figure 4:
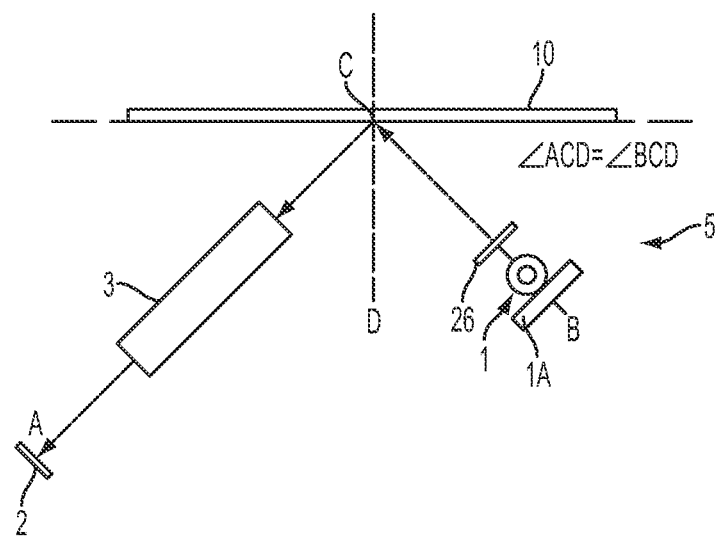
FIG. 4 is an example embodiment of an image input module of a printer or copier, the module having an illuminator, a light diffuser and a sensor according to aspects of the present disclosure.

FIG. 4 shows a schematic illustration of an image input module. The module has an end-coupled illuminator 1, a light diffuser 26, a lens array 3, and a sensor array 2. The illuminator 1 is located on a line B-C and is configured to emit a light beam that passes through the light diffuser 26. The light diffuser 26 is also located on the line B-C. The light beams from the light diffuser 26 are incident onto the image bearing surface 10 at point C, which is reflected, thereby producing generally specular reflectance in a first direction along line C-A, and some generally diffuse reflectance. The angle (ϕ ACD) between line A-C and normal line D-C is substantially equal to the angle (ϕBCD) between line B-C and normal line D-C, such that the illuminator array 1 is configured to emit a light beam onto the image bearing surface 10 at point C, thereby producing a generally specular reflectance from the image bearing surface 10 at a specular reflectance angle along line A-C. The linear sensor array 2 is positioned adjacent to the image bearing surface 10 and is located along line A-C, such that it captures the generally specular portion and the generally diffuse portion of the diffused light beam reflecting off the image bearing surface 10 at a specular reflectance angle at point C. This embodiment provides full resolution images for both types of reflected light. A calibration procedure could be determined so that the signals from the linear sensor array 2 can be used to work out the true specular reflectance and the difference between the specular and diffuse reflectances of the image being measured. For example, the amount of diffuse light being reflected at the specular angle is determined and the subsequent specular sensor readings are corrected by subtracting a fraction of the diffuse sensor signal from the specular sensor signal as discussed in U.S. Pat. No. 8,010,001, hereby incorporated by reference herein. Line C-D represents a normal line to the surface at a point C of the image bearing surface 10. Point C may actually be a line or a region on the surface of the image bearing surface 10.

Figure 5:
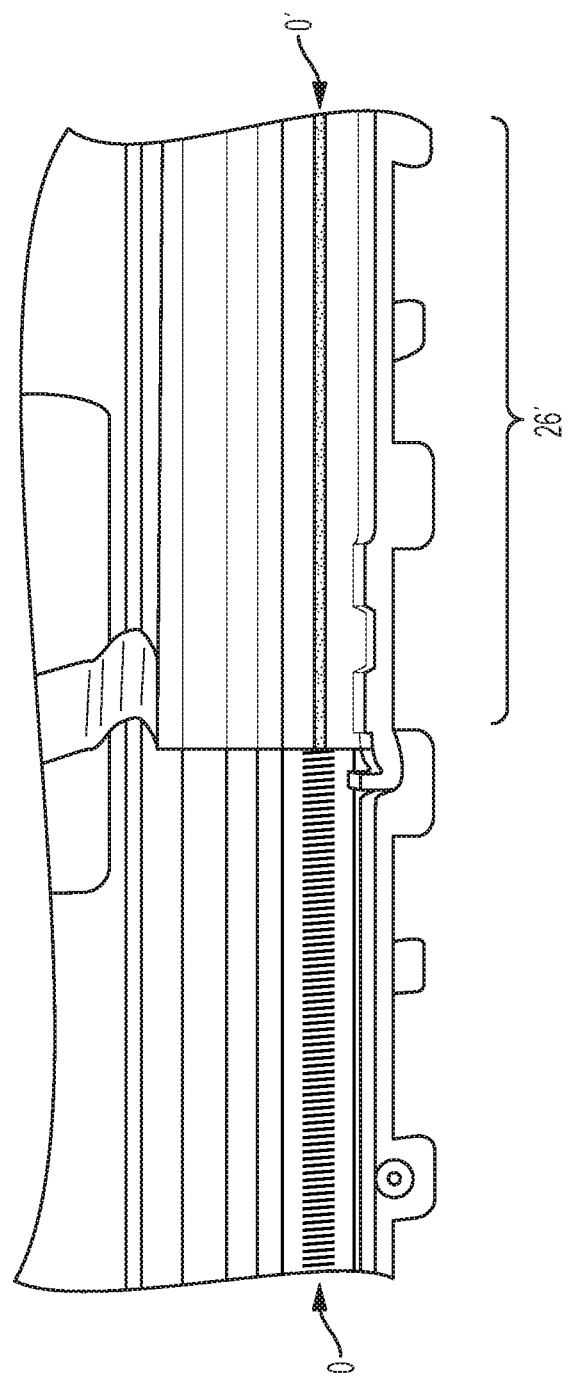
FIG. 5 is a photographic view of light output from a light pipe of an example illuminator that is partially covered by a diffuser.

FIG. 5 is a view of illumination from a light pipe of an illuminator that is partially covered by a diffuser 26'. As shown on the right side of FIG. 5, when light diffuser 26' is placed on top of an illumination apparatus comprising an end-coupled illuminator 1 (in the manner shown, for example, FIG. 2), a fairly homogenized radiance output O' from the diffuser is obtained, particularly in the direction of the illuminator longitudinal axis. The diffuser 26' homogenizes or makes more uniform non-uniformity arising due to the spacing of extractors 28a-28n (shown in FIG. 1A). As shown on the left side of FIG. 5, where the diffuser is not present, non-uniformities of radiance occur in output O where the extractors are so far apart that dark regions are noticeable. The particular diffuser used, for example, is a Light Shaping Diffuser (LSD). Plastic or ground glass diffusers could be used as well. The choice of diffuser is dependent on the parameters of a system, such as the distance of the diffuser from the illumination array. As discussed earlier, the position of the light diffuser relative to the light pipe is selected to facilitate homogenization of light exiting the illumination apparatus.

Figure 6:
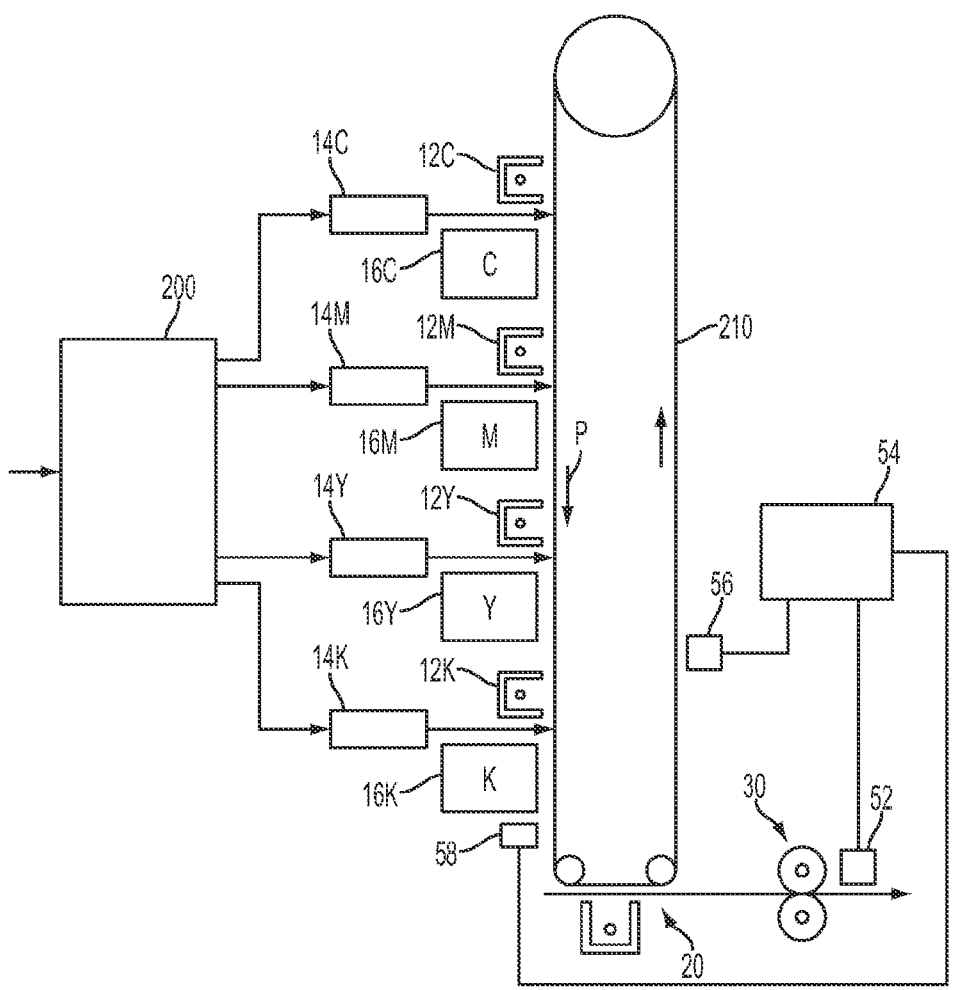
FIG. 6 is a simplified, schematic illustration of basic elements of an example of a xerographic color printer according to aspects of the present disclosure.

FIG. 6 is a simplified schematic view of basic elements of a color printer, comprising an illumination apparatus as described herein according to the present disclosure. Specifically, there is shown an "image-on-image" xerographic color printer, in which successive primary-color images are accumulated on a photoreceptor belt, and the accumulated superimposed images are in one step directly transferred to an output sheet as a full-color image. In one implementation, the Xerox Corporation iGen3® digital printing press may be utilized. However, it is appreciated that any printing machine, such as monochrome machines using any technology, machines which print on photosensitive substrates, xerographic machines with multiple photoreceptors, or ink-jet-based machines, can beneficially utilize the present disclosure as well.

Specifically, the embodiment shown in FIG. 6 includes a belt photoreceptor 210, along which are disposed a series of stations, as is generally familiar in the art of xerography, one set for each primary color to be printed. For instance, to place a cyan color separation image on photoreceptor 210, there is used a charge corotron 12C, an imaging laser 14C, and a development unit 16C. For successive color separations, there is provided equivalent elements 12M, 14M, 16M (for magenta), 12Y, 14Y, 16Y (for yellow), and 12K, 14K, 16K (for black). The successive color separations are built up in a superimposed manner on the surface of photoreceptor 210, and then the combined full-color image is transferred at transfer station 20 to an output sheet. The output sheet is then run through a fuser 30, as is familiar in xerography.

Also shown in the FIG. 6 is a set of what can be generally called "monitors," such as 56 and 58, which can feed back to a control device 54. The monitors such as 56 and 58 are devices which can make measurements to images created on the photoreceptor 210 or to images which were transferred to an output sheet (such as monitor 52). These monitors can, for example, be in the form of optical densitometers such as image input modules comprising illumination apparatus as described herein. There may be provided any number of monitors, and they may be placed anywhere in the printer as needed, not only in the locations illustrated. The information gathered therefrom is used by control device 54 in various ways to aid in the operation of the printer, whether in a real-time feedback loop, an offline calibration process, a registration system, etc.

Typically, a printer using control systems which rely on monitors such as 56, 58 require the deliberate creation of what shall be here generally called "test patches" which are made and subsequently measured in various ways by one or another monitor. These test marks may be in the form of test patches of a desired darkness value, a desired color blend, or a particular shape, such as a line pattern; or they may be of a shape particularly useful for determining registration of superimposed images ("fiducial" or "registration" marks). Various image-quality systems, at various times, will require test marks of specific types to be placed on photoreceptor 210 at specific locations. These test marks will be made on photoreceptor 210 by a print engine (e.g., one or more lasers such as 14C, 14M, 14Y, and 14K). Printing process may be controlled, for example, by a print controller 200.

As is familiar in the art of "laser printing," by coordinating the modulation of the various lasers with the motion of photoreceptor 210 and other hardware (such as rotating mirrors, etc., not shown), the lasers discharge areas on photoreceptor 210 to create the desired test marks, particularly after these areas are developed by their respective development units 16C, 16M, 16Y, 16K. The test marks must be placed on the photoreceptor 210 in locations where they can be subsequently measured by a (typically fixed) monitor elsewhere in the printer, for whatever purpose.

In an embodiment, the image input module 100, as described above (and shown in FIG. 2), can be placed just before or just after the transfer station 20 where the toner is transferred to the sheet, for example, on monitors such as 58, 56. In another embodiment, the image input module 100, may be placed directly on a printed sheet as the printed sheet comes out of the machine, for example, on monitor such as 52.

It will be appreciated that various of the above-disclosed and other features and functions, or alternatives thereof, may be desirably combined into many other different systems or applications. Various presently unforeseen or unanticipated alternatives, modifications, variations or improvements therein may be subsequently made by those skilled in the art which are also intended to be encompassed by the following claims.

What is claimed is:

1. An illumination apparatus for illuminating an image bearing surface, comprising:
   an end-coupled illuminator comprising a light pipe having a first end face, a lateral surface and an illuminator longitudinal axis, a first light source arranged to emit first light into the light pipe through the first end face, and a plurality of extractors disposed at selected locations along the illuminator longitudinal axis each configured to deflect a corresponding portion of the first light from the light pipe though the lateral surface; and
   a diffuser positioned to receive the portions of the first light and diffuse the portions of the first light in the direction of the illuminator longitudinal axis.

2. The apparatus of claim 1, wherein the diffuser is an elliptical diffuser.

3. The apparatus of claim 1, wherein the diffuser has a diffuser longitudinal axis that is substantially parallel to the illuminator longitudinal axis, the diffuser having a greater diffusion along the diffuser longitudinal axis than along a second axis that is perpendicular to the illuminator longitudinal axis and perpendicular to a plane including the illuminator longitudinal axis and the diffuser longitudinal axis.

4. The apparatus of claim 1, wherein the first light source comprises a first LED.

5. The apparatus of claim 1, wherein the first light source comprises a first plurality of sources of light.

6. The apparatus of claim 5, wherein sources of light constituting the first plurality of sources of light are all configured to emit light of a same color.

7. The apparatus of claim 5, wherein the first plurality of sources of light comprises a first source of light configured to emit light of a first color and a second source of light configured to emit light of a second color.

8. The apparatus of claim 1, wherein the light pipe has a second end face, the illuminator further comprising a second light source arranged to emit a second light into the light pipe through the second end face, at least some of the plurality of extractors each configured to deflect a corresponding portion of the second light from the light pipe though the lateral surface toward the diffuser.

9. The apparatus of claim 8, wherein the second light source comprises a second LED.

10. The apparatus of claim 1, wherein the extractors comprise at least one of a diffractive element, a refractive element and a reflective element.

11. The apparatus of claim 1, further comprising a second end face, the lateral surface extending between the first end face and the second end face.

12. A printer or copier, comprising:
 a print engine configured to apply a marking medium to an image bearing surface;
 a system for illuminating the image bearing surface in the printer or copier, the system comprising:
  A) an illumination apparatus comprising:
   (i.) an end-coupled illuminator comprising a light pipe having a first end face, a lateral surface, an illuminator longitudinal axis, a first light source arranged to emit first light into the light pipe through the first end face, and a plurality of extractors disposed at selected locations along the illuminator longitudinal axis each configured to deflect a corresponding portion of the first light from the light pipe though the lateral surface; and
   (ii.) a diffuser positioned to receive the portions of the first light and diffuse the portions of the first light in the direction of the illuminator longitudinal axis and thereby provide a light output, the illumination apparatus positioned to direct the light output onto the image bearing surface; and
  B.) a light sensor positioned relative to the image bearing surface such that at least one of a specular portion and a diffuse portion of the light output reflected from the image bearing surface is received by the light sensor.

13. The apparatus of claim 12, wherein the diffuser is an elliptical diffuser.

14. The apparatus of claim 12, wherein the diffuser has a diffuser longitudinal axis that is substantially parallel to the illuminator longitudinal axis, the diffuser having a greater diffusion along the diffuser longitudinal axis than along a second axis that is perpendicular to the illuminator longitudinal axis and perpendicular to a plane including the illuminator longitudinal axis and the diffuser longitudinal axis.

15. The apparatus of claim 12, wherein the first light source comprises a first LED.

16. The apparatus of claim 12, wherein the first light source comprises a first plurality of sources of light.

17. The apparatus of claim 16, wherein sources of light constituting the first plurality of sources of light are all configured to emit light of a same color.

18. The apparatus of claim 16, wherein the first plurality of sources of light comprises a first source of light configured to emit light of a first color and a second source of light configured to emit light of a second color.

19. The apparatus of claim 12, wherein the light pipe has a second end face, the illuminator further comprising a second light source arranged to emit a second light into the light pipe through the second end face,
 at least some of the plurality of extractors each configured to deflect a corresponding portion of the second light from the light pipe though the lateral surface toward the diffuser.

20. The apparatus of claim 19, wherein the second light source comprises a second LED.

21. The apparatus of claim 12, wherein the extractors comprise at least one of a diffractive element, a refractive element and a reflective element.

22. The apparatus of claim 12, further comprising a second end face, the lateral surface extending between the first end face and the second end face.

* * * * *